(12) United States Patent
Hu et al.

(10) Patent No.: US 9,405,147 B2
(45) Date of Patent: Aug. 2, 2016

(54) LIGHT EMITTING DEVICE AND BACKLIGHT MODULE INCLUDING SAME

(71) Applicant: HON HAI PRECISION INDUSTRY CO., LTD., New Taipei (TW)

(72) Inventors: Chau-Jin Hu, New Taipei (TW); Feng-Yuen Dai, New Taipei (TW); Yung-Lun Huang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 112 days.

(21) Appl. No.: 14/519,863

(22) Filed: Oct. 21, 2014

(65) Prior Publication Data

US 2015/0153017 A1 Jun. 4, 2015

(30) Foreign Application Priority Data

Nov. 30, 2013 (CN) .......................... 2013 1 0622204

(51) Int. Cl.
*G02F 1/1335* (2006.01)
*G02B 3/00* (2006.01)

(52) U.S. Cl.
CPC ................ *G02F 1/1336* (2013.01); *G02B 3/00* (2013.01); *G02F 1/133603* (2013.01); *G02F 2001/133607* (2013.01)

(58) Field of Classification Search
CPC ... G02B 3/00; G02F 1/1336; G02F 1/133603; G02F 1/133607
See application file for complete search history.

(56) References Cited

U.S. PATENT DOCUMENTS

| 8,696,175 B2* | 4/2014 | Yoon ......................... F21V 5/04 362/317 |
| 2015/0184826 A1* | 7/2015 | Hu ..................... G02B 19/0061 362/97.1 |

* cited by examiner

*Primary Examiner* — Stephen F Husar
(74) *Attorney, Agent, or Firm* — ScienBiziP, P.C.

(57) ABSTRACT

A light emitting device includes a light source and a light diverging unit including a first light diverging part and a second light diverging part including a bottom surface and a first light emitting surface connected by a side surface. The bottom surface defines a first receiving space for receiving the light source, the first light emitting surface defines a second receiving space communicating with the first receiving space, and the second receiving space comprises a first connecting surface. The second light diverging part is inserted into the second receiving space, and comprises a second light emitting surface and a second connecting surface. The second connecting surface fully contacts the first connecting surface, the second light emitting surface smoothly connects to the first light emitting surface. A refraction index of the first light diverging part is smaller than that of the second light diverging part.

18 Claims, 6 Drawing Sheets

LIGHT EMITTING DEVICE AND BACKLIGHT MODULE INCLUDING SAME

FIELD

The present disclosure relates to a light emitting device and a backlight module including the light emitting device.

BACKGROUND

A backlight module usually includes a light source and a light diffusion unit for diffusing the light emitted by the light source. Yet, as shown in FIG. 1, light diffused by the light diffusion unit is usually unevenly distributed and a strong light spot is formed at a center area.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
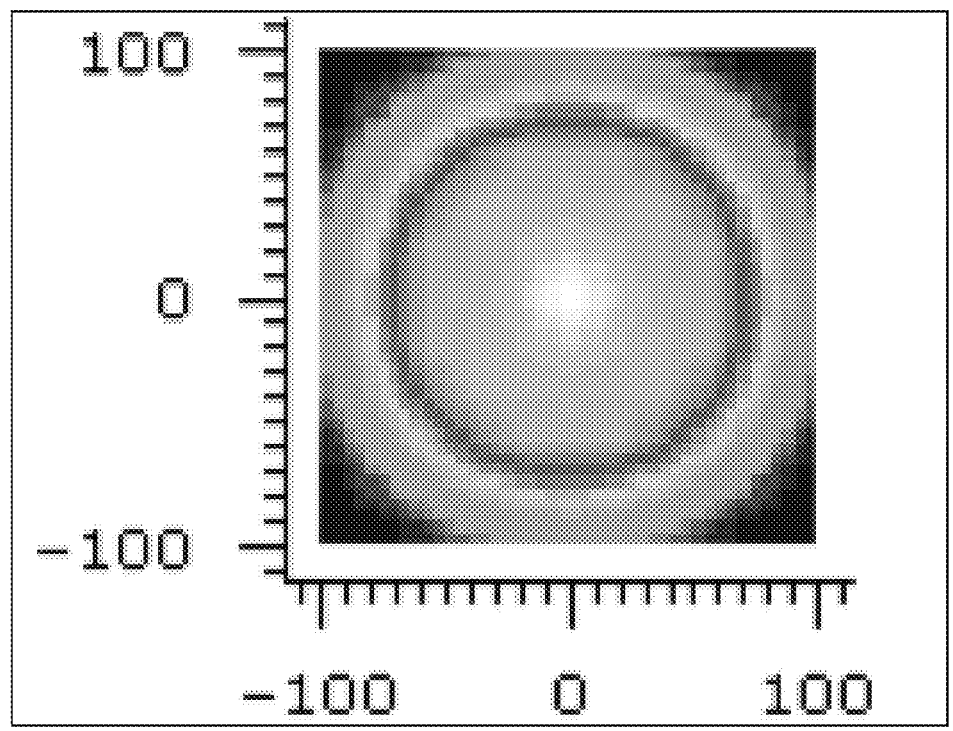
FIG. 1 is a light intensity distribution diagram of a conventional light emitting device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

A definition that applies throughout this disclosure will now be presented.

The term "comprising," when utilized, means "including, but not necessarily limited to"; it specifically indicates open-ended inclusion or membership in the so-described combination, group, series, and the like.

The present disclosure is described in relation to a light emitting device and a backlight module including the light emitting device.

Figure 2:
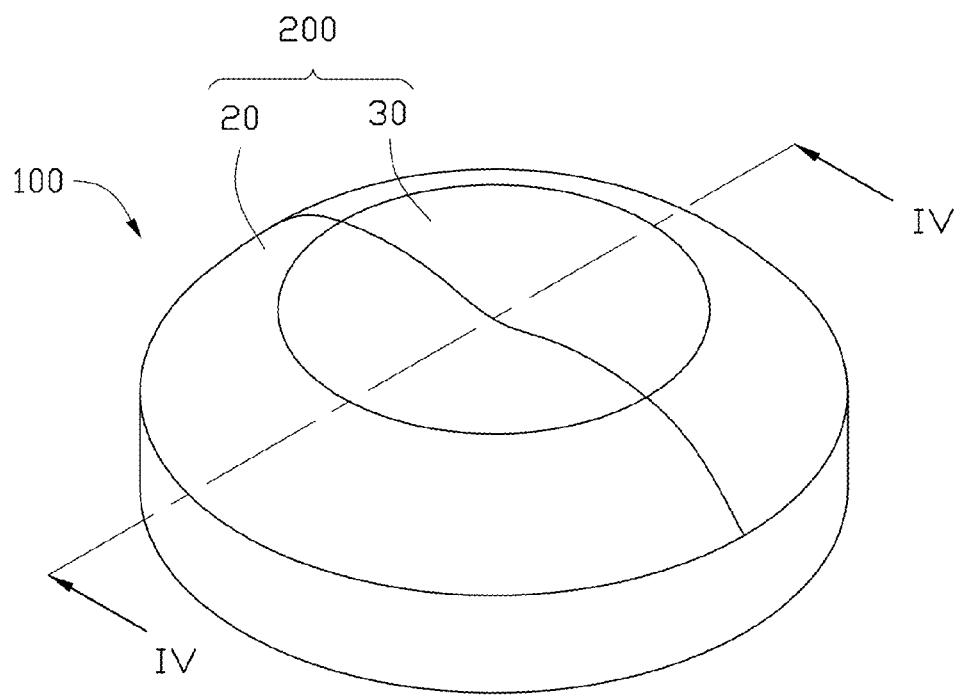
FIG. 2 is an isometric view of a light emitting device according to a first embodiment of the present disclosure.
Figure 3:
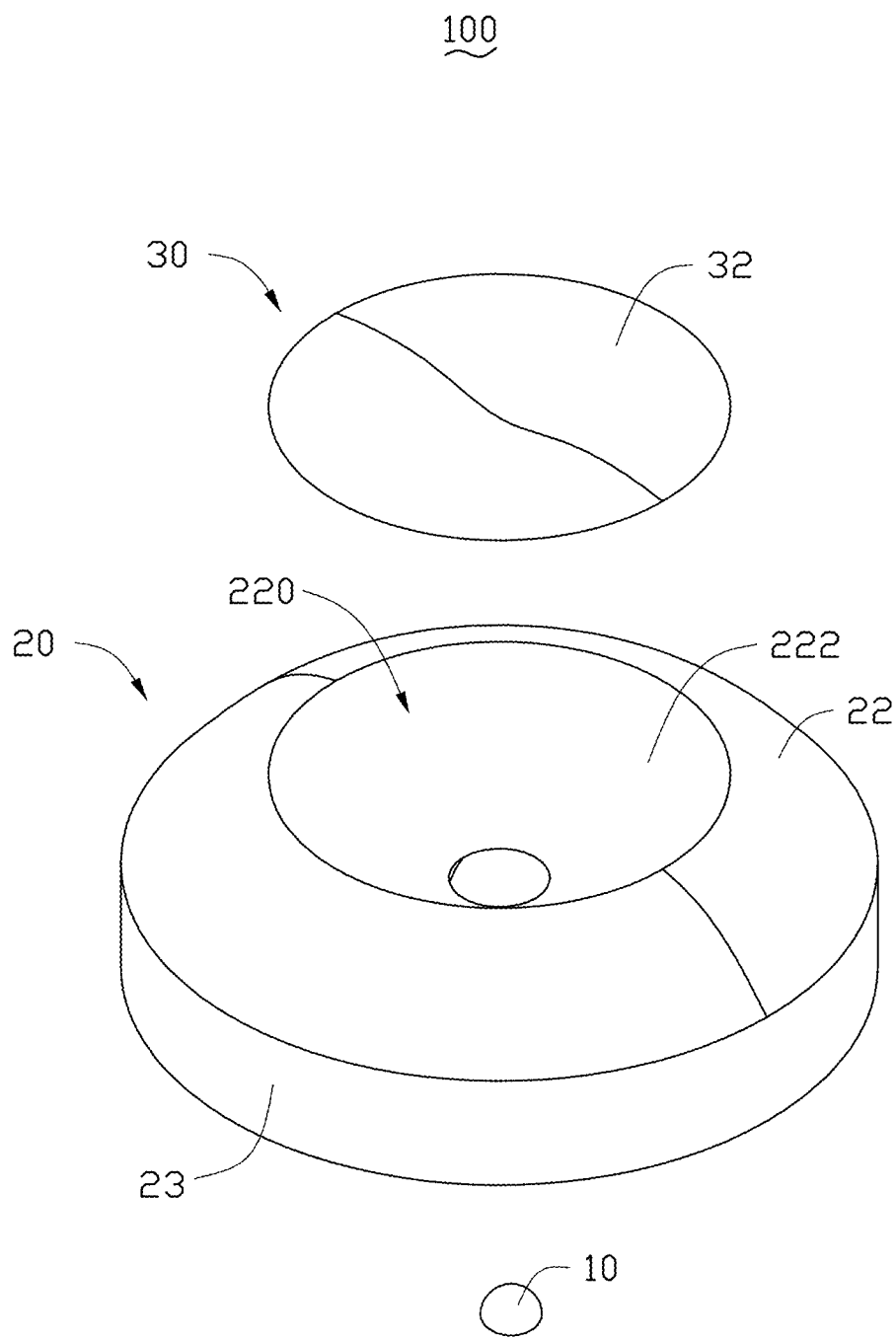
FIG. 3 is an exploded, isometric view of the light emitting device of FIG. 2.
Figure 4:
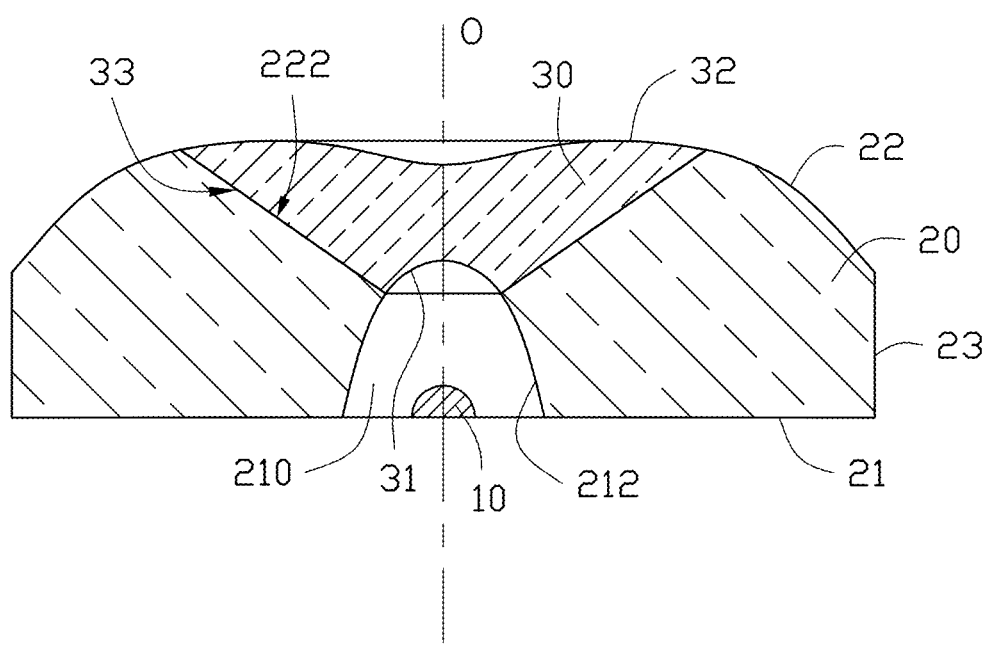
FIG. 4 is a cross sectional view taken along IV-IV line of FIG. 2.

FIGS. 2 to 4 show a light emitting device 100 including a light source 10 and a light diverging unit 200. In this embodiment, the light source 10 is a light emitting diode (LED). Light emitted by the light source 10 is scattered by the light diverging unit 200.

The light diverging unit 200 includes a first light diverging part 20 and a second light diverging part 30. The second light diverging part 30 is inserted into the first light diverging part 20 forming a lens.

The first diverging part 30 is symmetrical about a central axis O. The first diverging part 30 includes a bottom surface 21, a first light emitting surface 22, and a side surface 23. The bottom surface 21 is opposite to the first light emitting surface 22. The bottom surface 21 is a flat surface, and the first light emitting surface 22 is a curved surface. The bottom surface 21 defines a first receiving space 210. The first receiving space 210 includes a first light incident surface 212. The first light incident surface 212 is an aspheric surface. The light source 10 is received in the first receiving surface 210 and is located on the central axis O. The first light emitting surface 22 defines a second receiving space 220 communicating with the first receiving space 210. The second receiving space 220 includes a first connecting surface 222. The first connecting surface 222 connects the first light incident surface 212 and the first light emitting surface 22. The second receiving space 220 is continuously smaller from the light emitting surface 22 towards the first receiving space 210. In this embodiment, the second receiving space 220 is a partial cone (frustoconical).

The second light diverging part 30 is symmetrical about the centre axis O. The second light diverging part 30 includes a second light incident surface 31, a second light emitting surface 32 and a second connecting surface 33. The second light emitting surface 32 is opposite to the second light incident surface 31. The second connecting surface 33 connects the second light emitting surface 32 to the second light incident surface 31. The second light emitting surface 32 has an inward depression in the center that may be concave. The second light incident surface 31 is both concave and curved, and preferably tracks the curvature of the aspheric surface of first light incident surface 212. The second light diverging part 30 is received in the second receiving space 22. The second connecting surface 33 fully contacts the first connecting surface 222. In this embodiment, the side of second light diverging part 30 is a partial cone (frustoconical). The second light emitting surface 32 is smoothly connected to the first light emitting surface 22. The second light incident surface 31 is smoothly connected to the first light incident surface 212.

The first light diverging part 20 and the second light diverging part 30 are made of transparent resin. A refraction index of the first light diverging part 20 is smaller than the second light diverging part 30. In this embodiment, the refraction index of the first light diverging part 20 is about 1.49, and the refraction index of the second light diverging part 30 is in a range from about 1.52 to about 1.59, primarily about 1.52.

Figure 5:
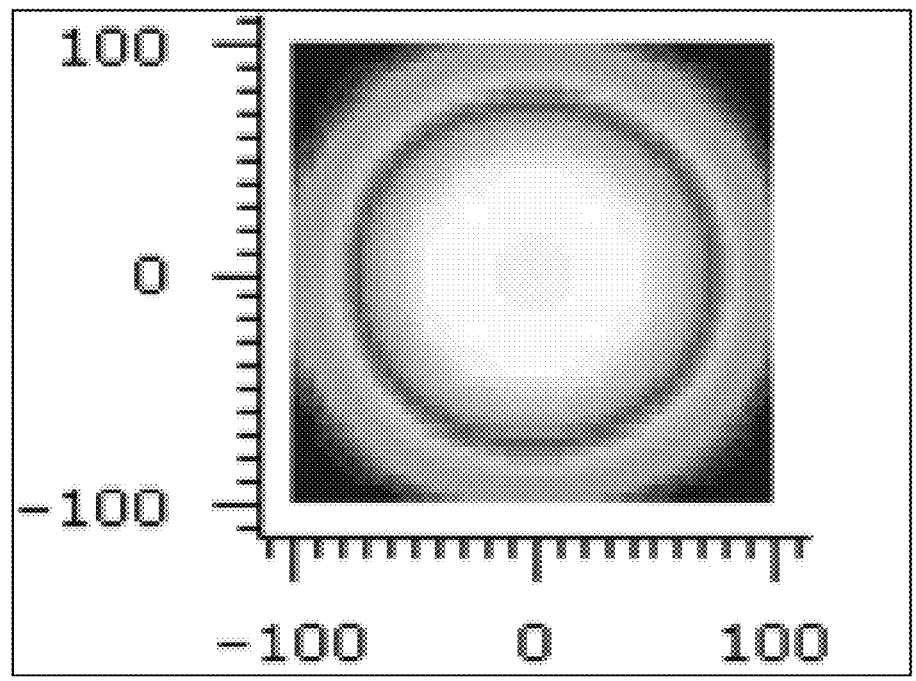
FIG. 5 is a light intensity distribution diagram of the light emitting device of FIG. 2.

Part of a light emitted by the light source 10 is introduced into the first light diverging part 20 from the first light incident surface 212, and is emitted from the first light emitting surface 22. Another part of light emitted by the light source 10 is introduced into the second light diverging part 30 from the second light incident surface 31, and is emitted from the second light emitting surface 32. FIG. 5 illustrates when the refraction index of the first light diverging part 20 is smaller than the refraction index of the second light diverging part 30, the light emitted by the light emitting device 100 is evenly distributed and no light spot is formed at a centre of the light emitting device 100.

Figure 6:
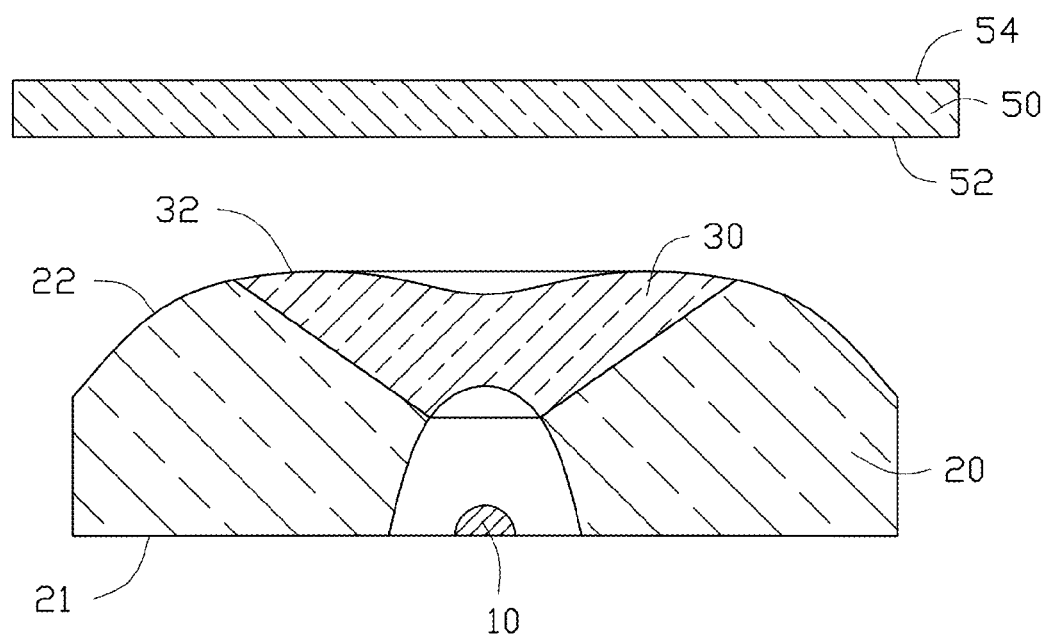
FIG. 6 is a cross sectional view of a back light module according to a second embodiment of the present disclosure.

FIG. 6 illustrates a backlight module 300 including the light emitting device 100 and a light diffusion board 50.

The light diffusion board 50 includes a light incident surface 52 and a light emitting surface 54 opposite to and parallel to the light incident surface 52. The light incident surface 52 is adjacent to the first light emitting surface 22. Light emitted by the light emitting device 100 is further scattered by the light diffusion board 50.

It will be understood that the above particular embodiments are shown and described by way of illustration only. The principles and the features of the present disclosure can be employed in various and numerous embodiments thereof without departing from the scope of the disclosure. The above-described embodiments illustrate the scope of the disclosure but do not restrict the scope of the disclosure.

What is claimed is:

1. A light emitting device comprising:
   a light source; and
   a light diverging unit comprising:
      a first light diverging part comprising a bottom surface, a first light emitting surface and a side surface connecting the bottom surface to the first light emitting surface, the bottom surface defining a first receiving space for receiving the light source, the first light emitting surface defining a second receiving space communicated with the first receiving space, the second receiving space comprising a first connecting surface; and
      a second light diverging part inserted into the second receiving space, and comprising a second light emitting surface and a second connecting surface, the second connecting surface fully contacting to the first connecting surface, the second light emitting surface smoothly connecting to the first light emitting surface; wherein
      a refraction index of the first light diverging part is smaller than a refraction index of the second light diverging part.

2. The light emitting device of claim 1, wherein the first light diverging part and the second light diverging part are both symmetrical about a central axis.

3. The light emitting device of claim 1, wherein the second receiving space is continuously smaller along a direction from the first light emitting surface towards the bottom surface.

4. The light emitting device of claim 3, wherein the second receiving space is a partial cone.

5. The light emitting device of claim 1, wherein the first receiving space comprises a first light incident surface, the first light incident surface is an aspheric surface, light emitted from the light source is introduced into the first light diverging part from the first light incident surface.

6. The light emitting surface of claim 5, wherein the second light diverging part comprises a second light incident surface opposite to the second light emitting surface, the second light incident surface smoothly connects to the first light incident surface, light emitted by the light source is introduced into the second light diverging part from the second light incident surface.

7. The light emitting surface of claim 1, wherein the refraction index of the first light diverging part is about 1.49, and the refraction index of the second light diverging part is in a range from about 1.52 to about 1.59.

8. The light emitting surface of claim 7, wherein the refraction index of the second light diverging part is about 1.52.

9. The light emitting surface of claim 1, wherein the light source is a light emitting diode.

10. A backlight module comprising:
    a light emitting device comprising:
       a light source; and
       a light diverging unit comprising:
          a first light diverging part comprising a bottom surface, a first light emitting surface and a side surface connecting the bottom surface to the first light emitting surface, the bottom surface defining a first receiving space for receiving the light source, the first light emitting surface defining a second receiving space communicated with the first receiving space, the second receiving space comprising a first connecting surface; and
          a second light diverging part inserted into the second receiving space, and comprising a second light emitting surface and a second connecting surface, the second connecting surface fully contacting to the first connecting surface, the second light emitting surface smoothly connecting to the first light emitting surface; wherein a refraction index of the first light diverging part is smaller than a refraction index of the second light diverging part; and
    a diffusion board aligned with the light emitting device.

11. The backlight module of claim 10, wherein the first light diverging part and the second light diverging part are both symmetrical about a central axis.

12. The backlight module of claim 10, wherein the second receiving space is continuously smaller along a direction from the first light emitting surface towards the bottom surface.

13. The backlight module of claim 12, wherein the second receiving space is a partial cone.

14. The backlight module of claim 10, wherein the first receiving space comprises a first light incident surface, the first light incident surface is an aspheric surface, light emitted from the light source is introduced into the first light diverging part from the first light incident surface.

15. The backlight module of claim 14, wherein the second light diverging part comprises a second light incident surface opposite to the second light emitting surface, the second light incident surface smoothly connects to the first light incident surface, light emitted by the light source is introduced into the second light diverging part from the second light incident surface.

16. The backlight module of claim 10, wherein the refraction index of the first light diverging part is about 1.49, and the refraction index of the second light diverging part is in a range from about 1.52 to about 1.59.

17. The backlight module of claim 16, wherein the refraction index of the second light diverging part is about 1.52.

18. The backlight module of claim 10, wherein the light source is a light emitting diode.

* * * * *